(12) United States Patent
Okamoto

(10) Patent No.: US 10,720,844 B2
(45) Date of Patent: Jul. 21, 2020

(54) POWER SUPPLY CONTROL DEVICE AND CONTROL METHOD FOR POWER SUPPLY CONTROL DEVICE

(71) Applicant: FANUC CORPORATION, Yamanashi (JP)

(72) Inventor: Jun Okamoto, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 27 days.

(21) Appl. No.: 16/256,216

(22) Filed: Jan. 24, 2019

(65) Prior Publication Data

US 2019/0238057 A1 Aug. 1, 2019

(30) Foreign Application Priority Data

Jan. 29, 2018 (JP) .................................. 2018-012148

(51) Int. Cl.
  *H02M 3/158* (2006.01)
  *H02M 1/08* (2006.01)
  *H02M 1/00* (2006.01)

(52) U.S. Cl.
  CPC ........... *H02M 3/1588* (2013.01); *H02M 1/08* (2013.01); *H02M 2001/0025* (2013.01)

(58) Field of Classification Search
  None
  See application file for complete search history.

(56) References Cited

U.S. PATENT DOCUMENTS 5,280,455 A   1/1994 Kanaishi
5,428,523 A * 6/1995 McDonnal ................ H02J 1/10
                                                   363/71

(Continued)

FOREIGN PATENT DOCUMENTS

JP   02-294269 A   12/1990
JP   03-290895     12/1991

(Continued)

OTHER PUBLICATIONS

Decision to Grant a Patent isssued by the Japanese Patent and Trademark Office in relation to Japanese Application No. 2018-012148 dated Feb. 4, 2020 (3 pages) along with English language translation (2 pages).

(Continued)

*Primary Examiner* — Jared Fureman
*Assistant Examiner* — Joel Barnett
(74) *Attorney, Agent, or Firm* — Robert P. Michal, Esq.; Carter, DeLuca & Farrell LLP

(57) ABSTRACT

A power supply control device for supplying electricity to a plurality of loads includes: a plurality of synchronous rectification type DC-DC converters, each regulating and supplying the power source to the load; a plurality of reference voltage circuits, each outputting a reference voltage; a common reference voltage circuit outputting a common reference voltage; a plurality of comparison circuits, each outputting a signal that corresponds to the difference between a feedback voltage, which is a fraction of the output voltage from the DC-DC converter, and the reference voltage or the common reference voltage; and a common reference voltage circuit controller controlling the common reference voltage circuit so that the common reference voltage falls when the input to the comparison circuit is switched from the reference voltage to the common reference voltage.

6 Claims, 5 Drawing Sheets

(56) References Cited

U.S. PATENT DOCUMENTS 6,841,977 B2 * 1/2005 Huang ................ H02M 3/1588
  323/224
2008/0094861 A1 * 4/2008 Wang .................... H02M 3/156
  363/21.11

FOREIGN PATENT DOCUMENTS

| JP | 06-342327 A | 12/1994 |
| JP | 2004-246441 A | 9/2004 |
| JP | 2005-065438 A | 3/2005 |
| JP | 2006311748 A | 11/2006 |
| JP | 2012157151 A | 8/2012 |

OTHER PUBLICATIONS

Notice of Reasons for Refusal issued by the Japanese Patent Office in relation to Japanese Application No. 2018-012148 dated Nov. 26, 2019 (2 pages) along with English language translation (2 pages).

* cited by examiner

POWER SUPPLY CONTROL DEVICE AND CONTROL METHOD FOR POWER SUPPLY CONTROL DEVICE

CROSS-REFERENCE TO RELATED APPLICATION

This application is based upon and claims the benefit of priority from Japanese Patent Application No. 2018-012148 filed on Jan. 29, 2018, the contents of which are incorporated herein by reference.

BACKGROUND OF THE INVENTION

Field of the Invention

The present invention relates to a power supply control device for supplying electricity to a plurality of loads installed in an apparatus as well as relating to a control method for the power supply control device.

Description of the Related Art

Japanese Laid-Open Patent Publication No. 2005-065438 discloses a power supply device provided with a plurality of power supply circuits for supplying electricity to each of a plurality of loads.

SUMMARY OF THE INVENTION

In an apparatus equipped with multiple loads, there are cases where the timing of raising the voltage of electricity supplied to each load and the timing of lowering the voltage of electricity supplied to each load are different from those of other loads. In such a case, it is necessary to provide separate power supply circuits for each load as in the technique of Japanese Laid-Open Patent Publication No. 2005-065438.

When sufficient power cannot be secured while the loads are driven, for example when a power supply stops working, it is possible to suppress damage to the multiple loads by performing control such that the voltages of electricity supplied to the loads are lowered at the same time and the ratio of the voltages of electricity supplied to the operating loads are kept constant while the voltages are lowered. However, it has been difficult to perform control of causing power supply circuits for the individual loads to lower the voltages of electricity simultaneously and to keep the ratio of voltages constant while the voltages are lowered.

The present invention has been devised in order to solve the above problem, it is therefore an object of the present invention to provide a power supply control apparatus and a control method of the power supply control apparatus which can individually control power supply to each of a plurality of loads and perform control so as to start lowering simultaneously voltages of electricity supplied to the individual loads and to lower the voltages of electricity supplied to the individual loads while the ratios of voltage therebetween at the time of the loads being driven are kept unchanged.

A first aspect of the invention resides in a power supply control device for supplying electricity to a plurality of loads provided in an apparatus, which includes: a synchronous rectification type DC-DC converter provided for each of the loads and configured to regulate a voltage of electricity input from a power source and supply the voltage to the load; a reference voltage circuit provided for each of the DC-DC converters and configured to output a reference voltage; a common reference voltage circuit commonly provided for the DC-DC converters and configured to output a common reference voltage; a comparison circuit provided for each of the DC-DC converters and configured to receive an input of a feedback voltage, which is a fraction of the output voltage from the DC-DC converter, and an input of the reference voltage or the common reference voltage and output a signal that corresponds to a difference between the feedback voltage and the reference voltage or the common reference voltage; a switching circuit configured to switch between the reference voltage and the common reference voltage and supply the selected one to the comparison circuit; a drive controller provided for each of the plurality of DC-DC converters and configured to drive and control the DC-DC converter based on the signal output from the comparison circuit; a switching circuit controller configured to control the switching circuit; and a common reference voltage circuit controller configured to control the common reference voltage circuit so that the common reference voltage falls when the switching circuit switches an input to the comparison circuit from the reference voltage to the common reference voltage.

A second aspect of the invention resides in a control method of a power supply control device (10) for supplying electricity to a plurality of loads (12) provided in an apparatus, wherein the power supply control device includes: a synchronous rectification type DC-DC converter (16) provided for each of the loads and configured to regulate a voltage of electricity input from a power source and supply the voltage to the load; a reference voltage circuit (18) provided for each of the DC-DC converters and configured to output a reference voltage (Vr); a common reference voltage circuit (38) commonly provided for the DC-DC converters and configured to output a common reference voltage (Vrc); a comparison circuit (20) provided for each of the DC-DC converters and configured to receive an input of a feedback voltage (Vfb), which is a fraction of the output voltage (V1, V2, V3) from the DC-DC converter, and an input of the reference voltage or the common reference voltage and output a signal that corresponds to a difference between the feedback voltage and the reference voltage or the common reference voltage; and a switching circuit (21) configured to switch between the reference voltage and the common reference voltage and supply the selected one to the comparison circuit. The control method comprises: a drive controlling step of driving and controlling the DC-DC converter based on the signal output from the comparison circuit; a switching circuit controlling step of controlling the switching circuit; and a common reference voltage circuit controlling step of controlling the common reference voltage circuit so that the common reference voltage falls when the switching circuit switches an input to the comparison circuit from the reference voltage to the common reference voltage.

According to the present invention, it is possible to individually control power supply to each of the loads. It is also possible to control the voltages of electricity supplied to respective loads so as to fall simultaneously while the ratios of voltage therebetween at the time of the loads being driven are kept unchanged.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

First Embodiment

[Configuration of Power Control Device]

Figure 1:
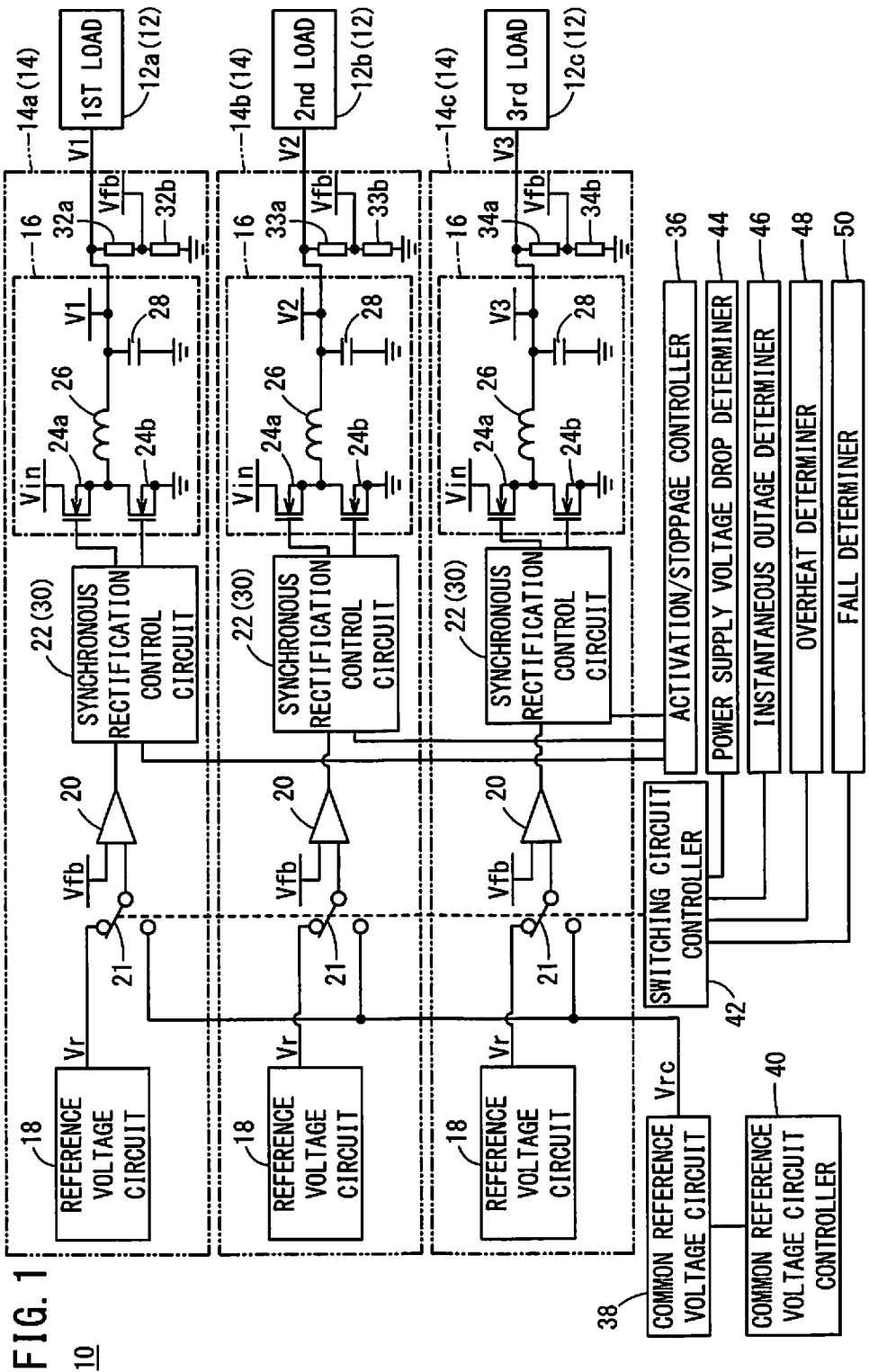
FIG. 1 is a circuit diagram showing a configuration of a power supply control device.

FIG. 1 is a circuit diagram showing a configuration of a power supply control device 10. The power supply control device 10 is a device that supplies a plurality of loads 12 (a first load 12a, a second load 12b and a third load 12c) installed on an unillustrated apparatus with supply voltages V1, V2 and V3 regulated according to the respective loads 12. The power supply control device 10 includes a first power supply circuit 14a for supplying electricity to the first load 12a, a second power supply circuit 14b for supplying electricity to the second load 12b and a third power supply circuit 14c for supplying electricity to the third load 12c.

The power supply circuits 14 (the first power supply circuit 14a, the second power supply circuit 14b and the third power supply circuit 14c) each include a DC-DC converter 16, a reference voltage circuit 18, a comparison circuit 20 and a synchronous rectification control circuit 22. Each DC-DC converter 16 adjusts a power supply voltage Vin input from an unillustrated DC power supply to output, as output voltages, supply voltages V1, V2 and V3 to be supplied to the respective loads 12. The output voltages from the DC-DC converters 16 may be referred to as output voltages V1, V2 and V3. The voltage values of the supply voltages V1, V2 and V3 and the output voltages V1, V2 and V3 are equal. The reference voltage circuit 18 outputs a reference voltage Vr. The reference voltage Vr output from the reference voltage circuit 18 of each power supply circuit 14 is set to be equal.

The comparison circuit 20 outputs a signal corresponding to the difference between a feedback voltage Vfb which is a fraction of the output voltage V1, V2, or V3 output from the DC-DC converter 16, and the reference voltage Vr output from the reference voltage circuit 18. The synchronous rectification control circuit 22, based on the signal output from the comparison circuit 20, performs PWM switching control on high-side and low-side switching elements 24a and 24b of the DC-DC converter 16.

The DC-DC converter 16 is a converter of a synchronous rectification type, including the high-side switching element 24a, the low-side switching element 24b, an inductor 26, and a capacitor 28.

As described above, the high-side switching element 24a and the low-side switching element 24b are PWM-controlled by the synchronous rectification control circuit 22, in accordance with the signal output from the comparison circuit 20 in response to the difference between the feedback voltage Vfb and the reference voltage Vr. As a result, the DC-DC converter 16 lowers the power supply voltage Vin to output the output voltage V1, V2 or V3. At this time, the high-side switching element 24a and the low-side switching element 24b are feedback-controlled by the synchronous rectification control circuit 22 so that the feedback voltage Vfb becomes equal to the reference voltage Vr. The synchronous rectification control circuit 22 constitutes a drive controller 30. Here, the control of the high-side switching element 24a and the low-side switching element 24b by the synchronous rectification control circuit 22 is not limited to the PWM control, but may use other control such as PFM control.

The output voltages V1, V2 and V3 output from the respective DC-DC converters 16 are divided by the resistors 32a, 32b, the resistors 33a, 33b, and the resistors 34a, 34b to be the respective feedback voltages Vfb.

In addition to the aforementioned power supply circuit 14, the power supply control device 10 further includes a activation/stoppage controller 36, a common reference voltage circuit 38, a common reference voltage circuit controller 40, a switching circuit controller 42, a power supply voltage drop determiner 44, an instantaneous outage determiner 46, an overheat determiner 48 and a fall determiner 50.

The activation/stoppage controller 36, based on an activation request or a stoppage request to each load 12 from the unillustrated control device that controls the aforementioned apparatus, outputs an activation signal for activating the load 12 or a stoppage signal for stopping the load 12 to the synchronous rectification control circuit 22 of the associated power supply circuit 14. The activation request and the stoppage request to each load 12 are output at appropriate timings for the individual loads 12.

When an activation signal is output from the activation/stoppage controller 36, the synchronous rectification control circuit 22 performs PWM control on the high-side switching element 24a and the low-side switching element 24b so as to gradually increase the feedback voltage Vfb to be eventually equal to the reference voltage Vr. Then, the synchronous rectification control circuit 22 performs PWM control on the high-side switching element 24a and the low-side switching element 24b so as to keep the feedback voltage Vfb equal to the reference voltage Vr. Thus, the DC-DC converters 16 produce output voltages V1, V2 and V3 adjusted to the supply voltages V1, V2 and V3 that are supplied to the respective loads 12.

When a stoppage signal is output from the activation/stoppage controller 36, the synchronous rectification control circuit 22 performs PWM control on the high-side switching element 24a and the low-side switching element 24b so as to gradually decrease the output voltage V1, V2 or V3 to be eventually zero.

The reference voltage circuit 18 is provided in each of the first second and third power supply circuits 14a, 14b and 14c, whereas the common reference voltage circuit 38 is shared by the first, second and third power supply circuits 14a, 14b and 14c. The common reference voltage circuit 38 outputs a common reference voltage Vrc. The common reference voltage circuit controller 40 controls the magnitude of the common reference voltage Vrc output from the common reference voltage circuit 38.

The input to the comparison circuit 20 of each power supply circuit 14 is switched between the reference voltage Vr and the common reference voltage Vrc by the switching circuit 21. When a signal is input from the power supply voltage drop determiner 44, the instantaneous outage determiner 46, the overheat determiner 48 or the fall determiner 50, the switching circuit controller 42 causes the switching circuits 21 to switch the input to the comparison circuit 20 of each power supply circuit 14 from the reference voltage Vr to the common reference voltage Vrc.

For example, when the power supply voltage Vin input from the power supply lowers to or is lower than a predetermined voltage level due to, for example, disconnection of the plug of the power supply cable of the apparatus from the outlet, the power supply voltage drop determiner 44 outputs to the switching circuit controller 42 a signal that indicates that the power supply voltage Vin has become equal to or lower than the predetermined voltage level. When a power failure phenomenon occurs in which the supply of electric power from the power source is interrupted for a very short time, the instantaneous outage determiner 46 outputs to the switching circuit controller 42 a signal indicating that the power failure phenomenon has occurred. When the temperature of the apparatus on which the load 12 is provided reaches or becomes higher than a predetermined temperature, the overheat determiner 48 outputs to the switching circuit controller 42 a signal indicating that the apparatus is in an overheated state. When the apparatus on which the load 12 is provided falls down to, for example, the ground, the fall determiner 50 outputs to the switching circuit controller 42 a signal indicating that the apparatus has fallen. The fall determiner 50 determines the fact of the apparatus having fallen to the ground when an acceleration of a predetermined magnitude or greater is detected by an unillustrated acceleration sensor, for example.

[Sequence Control Process of Power Control Device]

Figure 2:
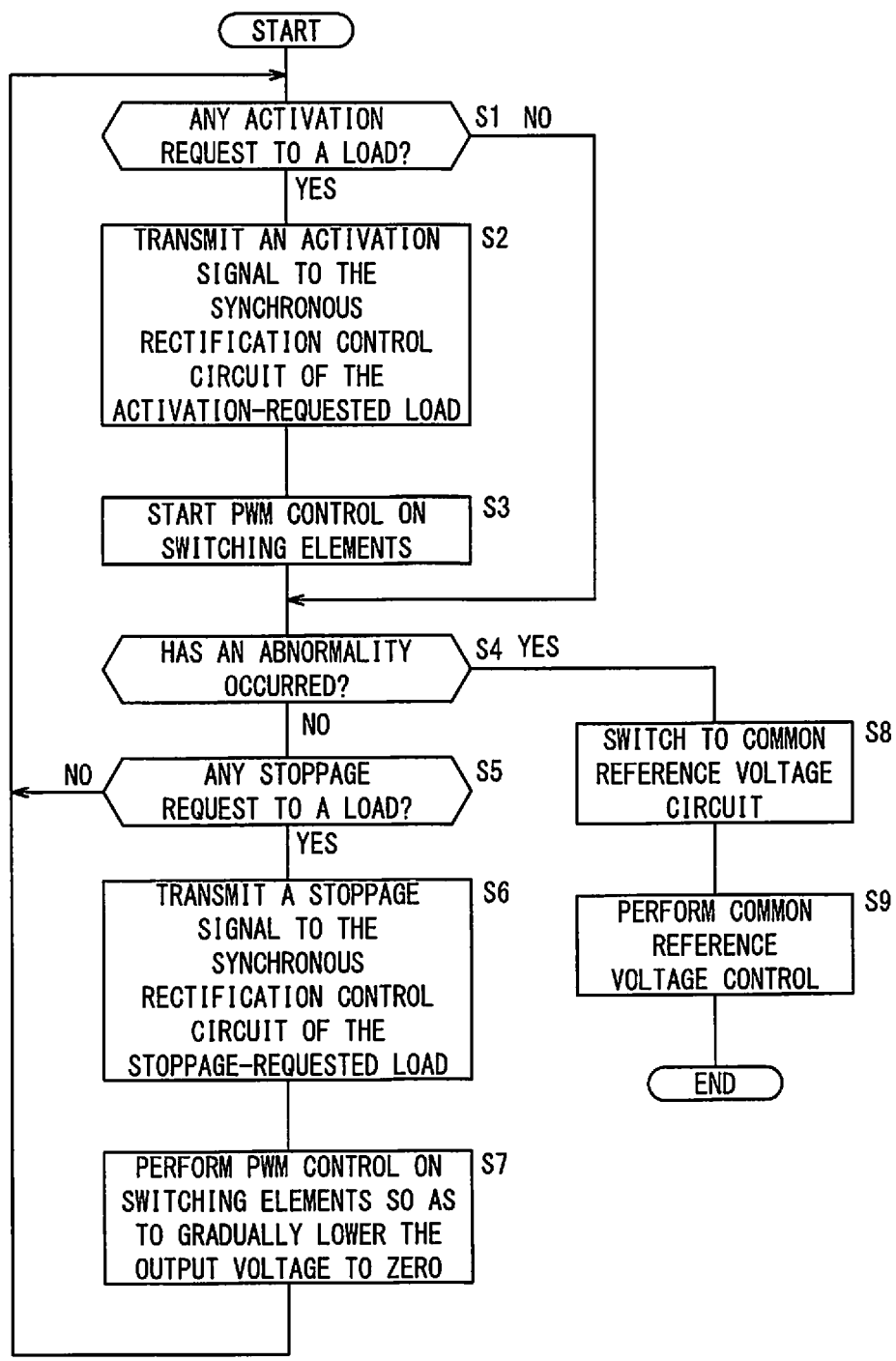
FIG. 2 is a flowchart showing the flow of control performed in the power supply control device.

FIG. 2 is a flowchart showing the flow of control performed in the power supply control device 10. At step S1, the activation/stoppage controller 36 determines whether or not there is an activation request to a load 12 from another control device. If there is a request to activate the load 12, the control proceeds to step S2, and when there is no activation request to activate the load 12, the control goes to step S4.

At step S2, the activation/stoppage controller 36 outputs an activation signal to the synchronous rectification control circuit 22 of the load 12 for which an activation request has been made, and the control proceeds to step S3. At step S3, the synchronous rectification control circuit 22 having received the activation signal starts PWM control on the high-side switching element 24a and the low-side switching element 24b, and the control proceeds to step S4.

At step S4, it is determined whether or not an abnormality has occurred in the apparatus. If an abnormality occurs in the apparatus, the control goes to step S8. When no abnormality has occurred in the apparatus, the control proceeds to step S5. The cases where an abnormality has occurred in the apparatus includes a case where the power supply voltage Vin becomes equal to or lower than the predetermined voltage level during the operation of each load 12, a case where the power failure phenomenon has occurred, a case where the apparatus has become overheated, and a case where the apparatus has fallen to the ground or the like.

At step S5, the activation/stoppage controller 36 determines whether there is a request to stop a load 12 from another control device. If there is a request to stop a load 12, the control goes to step S6, whereas if there is no request to stop a load 12, the control returns to step S1.

At step S6, the activation/stoppage controller 36 outputs a stoppage signal to the synchronous rectification control circuit 22 of the load 12 for which a stoppage request was made, and the control proceeds to step S7. At step S7, the synchronous rectification control circuit 22 having received the stoppage signal performs PWM control on the high-side switching element 24a and the low-side switching element 24b so as to gradually lower the output voltages V1, V2 and V3 to zero, and the control returns to step S1.

At step S8 after determination at step S4 that an abnormality has occurred in the apparatus, the switching circuit controller 42 causes the switching circuit 21 of every power supply circuit 14 to switch the input to the comparison circuit 20 of each power supply circuit 14 from the reference voltage Vr to the common reference voltage Vrc, and the control proceeds to step S9. At step S9, the common reference voltage circuit controller 40 controls the common reference voltage circuit 38 so that the common reference voltage Vrc falls, and the control is ended.

Figure 3:
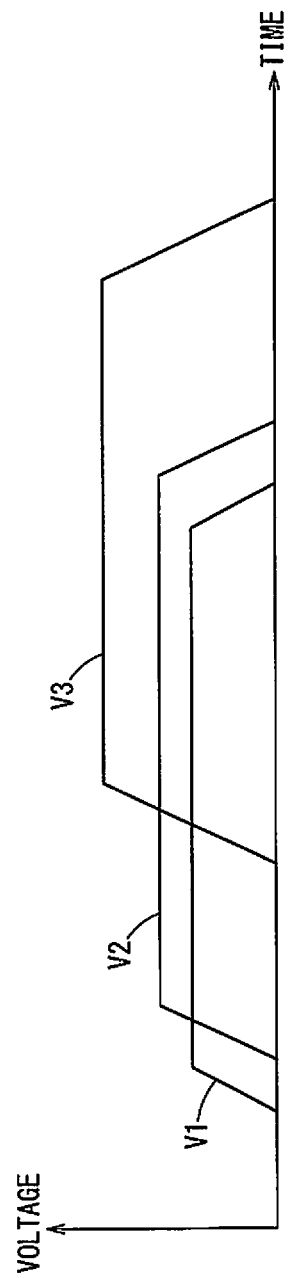
FIG. 3 is a diagram showing temporal changes of the supply voltage of electricity supplied from the power supply control device to individual loads.

FIG. 3 is a diagram showing temporal changes of the supply voltages V1, V2 and V3 of electricity supplied from the power supply control device 10 to the first load 12a, the second load 12b, and the third load 12c, respectively. The power supply control device 10 raises the supply voltages V1, V2 and V3 at certain timings for the first load 12a, the second load 12b, and the third load 12c, respectively. The timings at which the supply voltages V1, V2 and V3 are raised are controlled based on the time when the activation/stoppage controller 36 outputs an activation signal to the synchronous rectification control circuit 22 of each power supply circuit 14.

As an activation signal is output from the activation/stoppage controller 36, the synchronous rectification control circuit 22 performs PWM control on the high-side switching element 24a and the low-side switching element 24b so as to gradually increase the feedback voltage Vfb to be eventually equal to the reference voltage Vr. Thus, the supply voltages V1, V2 and V3 supplied from the power supply circuits 14 to the respective loads 12 rise and gradually increase.

Then, the synchronous rectification control circuit 22 performs PWM control on the high-side switching element 24a and the low-side switching element 24b so as to keep the feedback voltage Vfb equal to the reference voltage Vr. As a result, the supply voltages V1, V2 and V3 supplied from the power supply circuits 14 to the respective loads 12 are maintained at substantially constant voltages.

The power supply control device 10 lowers the supply voltages V1, V2 and V3 at certain timings for the first load 12a, the second load 12b, and the third load 12c, respectively. The timings at which the supply voltages V1, V2 and V3 are lowered are controlled based on the time when the activation/stoppage controller 36 outputs a stoppage signal to the synchronous rectification control circuit 22 of each power supply circuit 14.

As a stoppage signal is output from the activation/stoppage controller 36, the synchronous rectification control circuit 22 performs PWM control on the high-side switching element 24a and the low-side switching element 24b so as to gradually lower the output voltage V1, V2 or V3 to zero. Thus, the supply voltages V1, V2 and V3 supplied from the power supply circuits 14 to the respective loads 12 fall and gradually decrease. Here, however, because the reference voltage Vr output from the reference voltage circuit 18 does not fall even if a stoppage signal is output by the activation/stoppage controller 36, it is impossible for the synchronous rectification control circuit 22 to perform feedback control in lowering and gradually reducing the supply voltages V1, V2 and V3.

Figure 4:
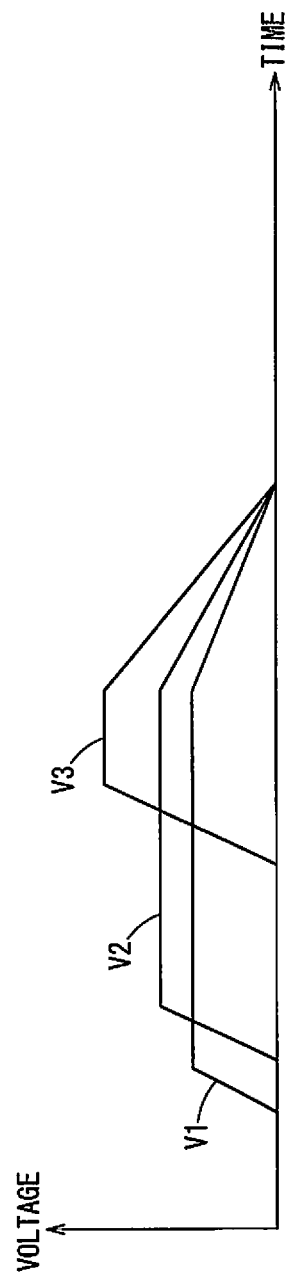
FIG. 4 is a diagram showing temporal changes in the supply voltage of electricity supplied from the power supply control device to individual loads at the time of occurrence of an abnormality.

FIG. 4 is a diagram showing temporal changes of the supply voltages V1, V2 and V3 of electricity supplied from the power supply control device 10 to the first load 12a, the second load 12b, and the third load 12c when an abnormality has occurred after the rise of the power supply voltages V1, V2 and V3. When a signal is supplied to the switching circuit controller 42 from the power supply voltage drop determiner 44, the instantaneous outage determiner 46, the overheat determiner 48, or the fall determiner 50, the switching circuit controller 42 causes the switching circuits 21 to switch the comparison circuits 20 from the reference voltage Vr to the common reference voltage Vrc.

Next, the common reference voltage circuit controller 40 controls the common reference voltage circuit 38 so that the common reference voltage Vrc falls and gradually reduces to zero. The synchronous rectification control circuit 22 performs PWM control on the high-side switching element 24a and the low-side switching element 24b so that the feedback voltage Vfb follows the common reference voltage Vrc. As a result, the supply voltages V1, V2 and V3 supplied from the respective power supply circuits 14 to the respective loads 12 simultaneously fall and gradually decrease while the ratio of the supply voltages V1, V2 and V3 at the time of the loads 12 being driven is kept unchanged. Since the common reference voltage Vrc output from the common reference voltage circuit 38 falls and gradually decreases to zero, it is possible for the synchronous rectification control circuits 22 to perform feedback control even when the supply voltages V1, V2 and V3 are made to fall and gradually lower in the case of occurrence of an abnormality.

[Operation and Effect]

The timings at which the supply voltages V1, V2 and V3 supplied to the respective loads 12 installed on the apparatus rise and fall are different depending on each load 12. Therefore, each load 12 is provided with a power supply circuit 14, and the activation/stoppage controller 36 performs sequence control on the multiple power supply circuits 14.

However, when sufficient power cannot be secured, for example, when the power supply voltage Vin decreases while the individual loads 12 are driven, there is not enough time to individually control the supply voltages V1, V2 and V3 that are supplied to the respective loads 12. To overcome this situation, the power supply control device 10 performs such control that the supply voltages V1, V2 and V3 of electricity supplied to the respective loads 12 start falling simultaneously and gradually decrease while the ratio of the supply voltages V1, V2 and V3 at the time of the loads 12 being driven is kept unchanged.

Normally, when each load 12 is stopped, the activation/stoppage controller 36 outputs a stoppage signal so that the synchronous rectification control circuit 22 controls the high-side switching element 24a and the low-side switching element 24b for the supply voltage V1, V2 or V3 to fall and gradually decrease. At this time, the synchronous rectification control circuit 22 cannot perform feedback control. Besides, among the power supply circuits 14, there are variations in the magnetic energy stored in the inductor 26 of the DC-DC converter 16 and the electrostatic energy stored in the capacitor 28. As a result, even if the activation/stoppage controller 36 outputs stoppage signals to respective synchronous rectification control circuits 22 simultaneously, the timings of falling and the rates of lowering of the output voltages V1, V2 and V3 output from respective DC-DC converters 16 of power supply circuits 14 become different from each other. That is, the supply voltages V1, V2 and V3 will not necessarily start falling at the same time, and the rates of lowering of the supply voltages V1, V2 and V3 will not be constant. When the supply voltages V1, V2 and V3 supplied to the respective loads 12 do not fall in given order, or when the magnitude relationship between the supply voltages V1, V2 and V3 changes, there is a risk of the loads 12 being damaged.

To avoid this situation, in the present embodiment the common reference voltage circuit 38 shared by all the power supply circuits 14 is provided so that in the event of an abnormality, the input to the comparison circuit 20 of each power supply circuit 14 can be switched to the common reference voltage Vrc. Further, the common reference voltage circuit controller 40 is configured to control the common reference voltage circuit 38 so that the common reference voltage Vrc lowers. As a result, the synchronous rectification control circuits 22 of all power supply circuits 14 can perform feedback control on the high-side switching element 24a and the low-side switching element 24b so that the feedback voltage Vfb which is a fraction of the output voltage V1, V2 or V3 coincides with the common reference voltage Vrc. Therefore, the supply voltages V1, V2 and V3 output from the DC-DC converters 16 can be made to fall, following the common reference voltage Vrc. Therefore, the power supply control device 10 can simultaneously start lowering the supply voltages V1, V2 and V3 and decrease the supply voltages V1, V2 and V3 while the ratios therebetween are kept unchanged.

Further, in the present embodiment, the switching circuit controller 42 is configured to control the switching circuits 21 to switch the input to the comparison circuit 20 from the reference voltage Vr to the common reference voltage Vrc when the power supply voltage Vin becomes equal to or lower than the predetermined voltage level, when the power failure phenomenon occurs, when the apparatus is overheated, or when the apparatus falls to the ground or the like. Moreover, the common reference voltage circuit controller 40 is configured to control the common reference voltage circuit 38 so that the common reference voltage Vrc lowers. As a result, when sufficient electric power cannot be secured or when insufficiency of electric power is expected to occur, the supply voltages V1, V2 and V3 are made to fall all together and lowered while the ratios therebetween are kept unchanged, thereby making it possible to suppress occurrence of damage to each load 12.

Second Embodiment

Figure 5:
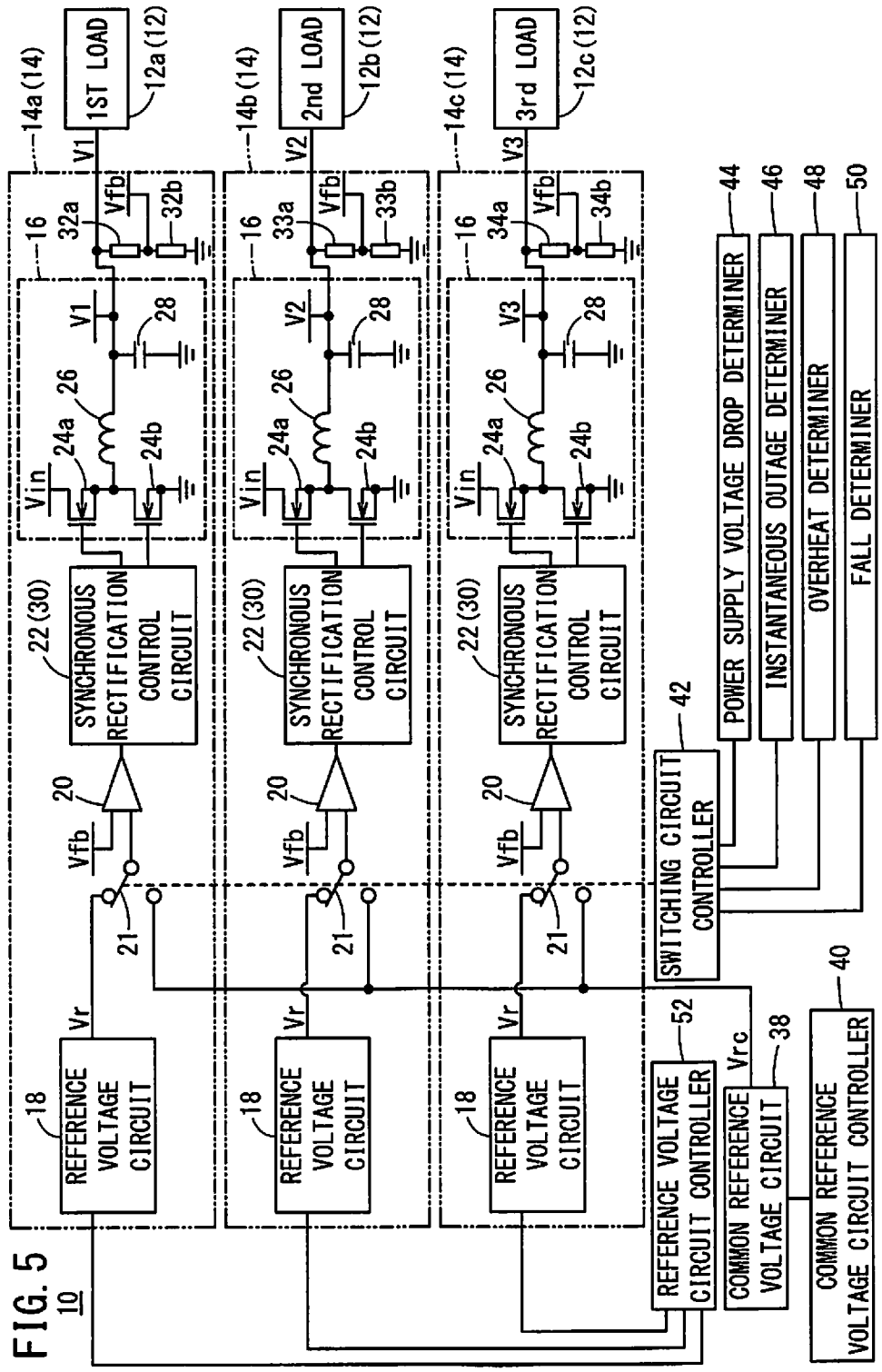
FIG. 5 is a circuit diagram showing a configuration of a power supply control device.

FIG. 5 is a circuit diagram showing a configuration of a power supply control device 10. In the first embodiment, when each load 12 is activated, an activation signal is output from the activation/stoppage controller 36 and the synchronous rectification control circuit 22 of the power supply circuit 14 gradually increases the feedback voltage Vfb to be eventually equal to the reference voltage Vr by performing PWM control on the high-side switching element 24a and the low-side switching element 24b. Then, when each load 12 is stopped, a stoppage signal is output from the activation/stoppage controller 36 and the synchronous rectification control circuit 22 of the power supply circuit 14 gradually reduces the output voltages V1, V2 or V3 to be eventually zero by performing PWM control on the high-side switching element 24a and the low-side switching element 24b.

In the present embodiment, instead of the activation/stoppage controller 36, the power supply control device 10 is provided with a reference voltage circuit controller 52 for controlling the reference voltage Vr output from the reference voltage circuit 18 of each power supply circuit 14.

When each load 12 is activated, the reference voltage circuit controller 52 controls the reference voltage circuit 18 so that the reference voltage Vr rises. The synchronous rectification control circuit 22 performs PWM control on the high-side switching element 24a and the low-side switching element 24b so that the feedback voltage Vfb follows the reference voltage Vr. As the reference voltage Vr rises, the output voltages V1, V2, and V3 output from the DC-DC converter 16 also rise.

When each load 12 is stopped, the reference voltage circuit controller 52 controls the reference voltage circuit 18 so that the reference voltage Vr falls. The synchronous rectification control circuit 22 performs PWM control on the high-side switching element 24a and the low-side switching element 24b so that the feedback voltage Vfb follows the reference voltage Vr. As the reference voltage Vr falls, the output voltages V1, V2, and V3 output from the DC-DC converter 16 also fall.

[Operation and Effect]

In the first embodiment, when the power supply control device 10 lowers the supply voltages V1, V2, and V3, the synchronous rectification control circuit 22 cannot perform feedback control on the high-side switching element 24a and the low-side switching element 24b. Therefore, after the output of the stoppage signal from the activation/stoppage controller 36, the timings of falling of the output voltages V1, V2 and V3 and the rates of lowering of the output voltages V1, V2 and V3 fluctuate depending on the amounts of magnetic energy stored in the inductors 26 and the amounts of electrostatic energy stored in the capacitors 28. Therefore, there is a risk that the timing at which the output voltages V1, V2 and V3 fall and the lowering rate at which the output voltages V1, V2 and V3 fall become different from each other.

In the present embodiment, when the load 12 is stopped, the reference voltage circuit controller 52 controls so as to make the reference voltage Vr output from the reference voltage circuit 18 of each power supply circuit 14 fall. The synchronous rectification control circuit 22, based on a signal corresponding to the difference between the reference voltage Vr and the feedback voltage Vfb, performs PWM control on the high-side switching element 24a and the low-side switching element 24b. As a result, the synchronous rectification control circuit 22 can perform feedback control on the high-side switching element 24a and the low-side switching element 24b when each of the supply voltages V1, V2 and V3 is lowered and gradually reduced. Thus, it is possible to cause the falling timings and the lowering rates of the output voltages V1, V2 and V3 to follow the associated reference voltages Vr, hence accurately control the falling timings and the lowering rates of the supply voltages V1, V2 and V3.

[Technical Ideas Obtained From Embodiment]

Technical ideas that can be grasped from the above embodiment will be described below.

A power supply control device (10) for supplying electricity to a plurality of loads (12) provided in an apparatus includes: a synchronous rectification type DC-DC converter (16), provided for each of the multiple loads (12), and configured to regulate the voltage of electricity input from a power source and supply the voltage to the load (12); a reference voltage circuit (18), provided for each of the DC-DC converters (16), and configured to output a reference voltage (Vr); a common reference voltage circuit (38), commonly provided for the multiple DC-DC converters (16), and configured to output a common reference voltage (Vrc); a comparison circuit (20), provided for each of the DC-DC converters (16) and configured to receive an input of a feedback voltage (Vfb), which is a fraction of the output voltage (V1, V2, V3) from the DC-DC converter (16), and an input of the reference voltage (Vr) or the common reference voltage (Vrc) and output a signal that corresponds to the difference between the feedback voltage (Vfb) and the reference voltage (Vr) or the common reference voltage (Vrc); a switching circuit (21) configured to switch between the reference voltage (Vr) and the common reference voltage (Vrc) and supply the selected one to the comparison circuit (20); a drive controller (30), provided for each of the plurality of DC-DC converters (16), and configured to drive and control the DC-DC converter (16) based on the signal output from the comparison circuit (20); a switching circuit controller (42) configured to control the switching circuit (21); and a common reference voltage circuit controller (40) configured to control the common reference voltage circuit (38) so that the common reference voltage (Vrc) falls when the switching circuit (21) switches the input to the comparison circuit (20) from the reference voltage to the common reference voltage (Vrc). As a result, the power supply control device (10) simultaneously falls down the supply voltages (V1, V2, V3) supplied to the respective loads (12) and decreases the supply voltages (V1, V2, V3) while keeping the ratio therebetween the same.

In the above power supply control device (10), the switching circuit controller (42) may be configured to cause the switching circuit (21) to switch the input to the comparison circuit (20) from the reference voltage (Vr) to the common reference voltage (Vrc) when the voltage of electricity input from the power supply lowers to a predetermined voltage or lower, when the electricity input from the power supply is instantaneously interrupted, when a signal indicating an overheat of the apparatus is input, or when a signal indicating that the apparatus has fallen is input. As a result, the supply voltages (V1, V2, V3) supplied to the respective loads (12) are made to fall all together and lowered before exhaustion of power while keeping the ratio therebetween the same, thereby making it possible to suppress occurrence of damage to each load 12.

The above power supply control device (10) may further include a reference voltage circuit controller (52) configured to control the reference voltage circuits (18) so that the reference voltages (Vr) rise at different timings corresponding to respective loads (12) when the multiple loads (12) are activated. As a result, it is possible to accurately control the supply voltages (V1, V2, V3) supplied to the respective loads (12) when the loads (12) deactivated.

In a control method of a power supply control device (10) for supplying electricity to a plurality of loads (12) provided in an apparatus, the power supply control device (10) includes: a synchronous rectification type DC-DC converter (16), provided for each of the multiple loads (12), and configured to regulate the voltage of electricity input from a power source and supply the voltage to the, load (12); a reference voltage circuit (18), provided for each of the DC-DC converters (16), and configured to output a reference voltage (Vr); a common reference voltage circuit (38), commonly provided for the multiple DC-DC converters (16), and configured to output a common reference voltage (Vrc); a comparison circuit (20), provided for each of the DC-DC converters (16) and configured to receive an input of a feedback voltage (Vfb), which is a fraction of the output voltage (V1, V2, V3) from the DC-DC converter (16), and an input of the reference voltage (Vr) or the common reference voltage (Vrc) and output a signal that corresponds to the difference between the feedback voltage (Vfb) and the reference voltage (Vr) or the common reference voltage (Vrc); and a switching circuit (21) configured to switch between the reference voltage (Vr) and the common reference voltage (Vrc) and supply the selected one to the comparison circuit (20). The control method comprises: a drive controlling step, effected for each of the plurality of DC-DC converters (16), of driving and controlling the DC-DC converter (16) based on the signal output from the comparison circuit (20); a switching circuit controlling step of controlling the switching circuit (21); and a common reference voltage circuit controlling step of controlling the common reference voltage circuit (38) so that the common reference voltage (Vrc) falls when the switching circuit (21) switches the input to the comparison circuit (20) from the reference voltage (Vr) to the common reference voltage (Vrc). As a result, the power supply control device (10) simultaneously falls down the supply voltages (V1, V2, V3) supplied to the respective loads (12) and decreases the supply voltages (V1, V2, V3) while keeping the ratio therebetween the same.

In the control method of a power supply control device (10), the switching circuit controlling step may cause the switching circuit (21) to switch the input to the comparison circuit (20) from the reference voltage (Vr) to the common reference voltage (Vrc) when the voltage of electricity input from the power supply lowers to a predetermined voltage or lower, when the electricity input from the power supply is instantaneously interrupted, when a signal indicating an overheat of the apparatus is input, or when a signal indicating that the apparatus has fallen is input. As a result, the supply voltages (V1, V2, V3) supplied to the respective loads (12) are made to fall all together and lowered before exhaustion of power while keeping the ratio therebetween the same, thereby making it possible to suppress occurrence of damage to each load 12.

In the control method of a power supply control device (10) may further comprise a reference voltage circuit controlling step of controlling the reference voltage circuits (18) so that the reference voltages (Vr) rise at different timings corresponding to respective loads (12) when the multiple loads (12) are activated. As a result, it is possible to accurately control the supply voltages (V1, V2, V3) supplied to the respective loads (12) when the loads (12) deactivated.

The present invention is not limited to the above-described embodiment, and various modifications can be made without departing from the gist of the present invention.

What is claimed is:

1. A power supply control device for supplying electricity to a plurality of loads provided in an apparatus, comprising:
    a synchronous rectification type DC-DC converter provided for each of the loads and configured to regulate a voltage of electricity input from a power source and supply the voltage to the load;
    a reference voltage circuit provided for each of the DC-DC converters and configured to output an equal reference voltage;
    a common reference voltage circuit commonly provided for the DC-DC converters and configured to output a common reference voltage;
    a comparison circuit provided for each of the DC-DC converters and configured to receive an input of a feedback voltage, which is a fraction of the output voltage from the DC-DC converter, and an input of the reference voltage or the common reference voltage and output a signal that corresponds to a difference between the feedback voltage and the reference voltage or the common reference voltage;
    a switching circuit configured to switch between the reference voltage and the common reference voltage and supply the selected one to the comparison circuit;
    a drive controller provided for each of the plurality of DC-DC converters and configured to drive and control the DC-DC converters based on the signal output from the comparison circuit;
    a switching circuit controller configured to control the switching circuit; and
    a common reference voltage circuit controller configured to control the common reference voltage circuit so that the common reference voltage falls when the switching circuit switches an input to the comparison circuit from the reference voltage to the common reference voltage.

2. The power supply control device according to claim 1, wherein the switching circuit controller is configured to cause the switching circuit to switch the input to the comparison circuit from the reference voltage to the common reference voltage when the voltage of electricity input from the power supply lowers to a predetermined voltage or lower, when the electricity input from the power supply is instantaneously interrupted, when a signal indicating an overheat of the apparatus is input, or when a signal indicating that the apparatus has fallen is input.

3. The power supply control device according to claim 1, further comprising a reference voltage circuit controller configured to control the reference voltage circuits so that the reference voltages rise at different timings corresponding to respective loads when the loads are activated.

4. A control method of a power supply control device for supplying electricity to a plurality of loads provided in an apparatus, wherein,
    the power supply control device includes:
        a synchronous rectification type DC-DC converter provided for each of the loads and configured to regulate a voltage of electricity input from a power source and supply the voltage to the load;
        a reference voltage circuit provided for each of the DC-DC converters and configured to output an equal reference voltage;
        a common reference voltage circuit commonly provided for the DC-DC converters and configured to output a common reference voltage;
        a comparison circuit provided for each of the DC-DC converters and configured to receive an input of a feedback voltage, which is a fraction of the output voltage from the DC-DC converter, and an input of the reference voltage or the common reference voltage and output a signal that corresponds to a difference between the feedback voltage and the reference voltage or the common reference voltage; and
        a switching circuit configured to switch between the reference voltage and the common reference voltage and supply the selected one to the comparison circuit,
    the control method comprises:
        a drive controlling step of driving and controlling the DC-DC converter based on the signal output from the comparison circuit;
        a switching circuit controlling step of controlling the switching circuit; and
        a common reference voltage circuit controlling step of controlling the common reference voltage circuit so that the common reference voltage falls when the switching circuit switches an input to the comparison circuit from the reference voltage to the common reference voltage.

5. The control method of a power supply control device according to claim 4, wherein the switching circuit controlling step causes the switching circuit to switch the input to the comparison circuit from the reference voltage to the common reference voltage when the voltage of electricity input from the power supply lowers to a predetermined voltage or lower, when the electricity input from the power supply is instantaneously interrupted, when a signal indicating an overheat of the apparatus is input, or when a signal indicating that the apparatus has fallen is input.

6. The control method of a power supply control device according to claim 4, further comprising a reference voltage circuit controlling step of controlling the reference voltage circuits so that the reference voltages rise at different timings corresponding to respective loads when the loads are activated.

* * * * *